(12) United States Patent
Moorthy (10) Patent No.: US 12,254,011 B2
(45) Date of Patent: Mar. 18, 2025

(54) DATABASE ACCESS REQUEST PROCESSING DISTRIBUTION

(71) Applicant: RAKUTEN MOBILE, INC., Tokyo (JP)

(72) Inventor: Ramkumar Moorthy, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/321,774

(22) Filed: May 23, 2023

(65) Prior Publication Data

US 2024/0394261 A1    Nov. 28, 2024

(51) Int. Cl.
*G06F 7/00* (2006.01)
*G06F 16/2453* (2019.01)
*G06F 16/2455* (2019.01)

(52) U.S. Cl.
CPC .. *G06F 16/24568* (2019.01); *G06F 16/24542* (2019.01)

(58) Field of Classification Search
CPC ............... G06F 16/24568; G06F 16/24542
See application file for complete search history.

(56) References Cited

U.S. PATENT DOCUMENTS

| | | | | | |
|---|---|---|---|---|---|
| 5,799,173 | A | * | 8/1998 | Gossler | G06F 9/5083 703/22 |
| 5,966,372 | A | * | 10/1999 | Wright | H04Q 3/0091 370/329 |
| 6,128,657 | A | * | 10/2000 | Okanoya | H04L 67/1001 709/224 |
| 6,681,251 | B1 | * | 1/2004 | Leymann | H04L 67/1001 709/228 |
| 7,389,510 | B2 | * | 6/2008 | Forrester | G06F 9/505 709/224 |
| 7,747,662 | B2 | * | 6/2010 | Vivekanand | H04L 67/568 707/827 |
| 8,918,506 | B1 | * | 12/2014 | Clubb | G06Q 20/36 709/224 |
| 10,169,609 | B1 | * | 1/2019 | Barday | G06F 21/6245 |
| 10,984,011 | B1 | * | 4/2021 | Bishop | G06F 9/5083 |
| 11,503,104 | B1 | * | 11/2022 | Thomas | H04L 67/60 |
| 2007/0156869 | A1 | * | 7/2007 | Galchev | G06F 9/505 709/224 |
| 2008/0243867 | A1 | * | 10/2008 | Janedittakarn | G06F 16/245 |
| 2009/0144285 | A1 | * | 6/2009 | Chatley | H04L 67/1021 |
| 2009/0248475 | A1 | * | 10/2009 | Choi | G06Q 10/107 709/219 |

(Continued)

*Primary Examiner* — Mohammed R Uddin
(74) *Attorney, Agent, or Firm* — HAUPTMAN HAM, LLP (57) ABSTRACT

Database access request processing distribution is performed by receiving requests from a plurality of worker servers, the requests including database access requests, and maintaining a queue of the requests. Queues are maintained by adding each request to a queue in response to receiving the request, assigning, for each request, a master server among a plurality of master servers to process the request, and removing each request from the queue in response to processing of the request. The assigning includes assigning the first master server among the plurality of master servers to process the database access requests until the database access requests in the queue exceed a first threshold, and then distributing assignments to process the database access requests among the plurality of master servers.

20 Claims, 5 Drawing Sheets

(56) References Cited

U.S. PATENT DOCUMENTS

| | | | |
|---|---|---|---|
| 2011/0044174 A1* | 2/2011 | Szymanski | H04L 47/6295 |
| | | | 370/238 |
| 2011/0246434 A1* | 10/2011 | Cheenath | G06F 16/2386 |
| | | | 707/703 |
| 2015/0163161 A1* | 6/2015 | Arikatla | H04L 45/026 |
| | | | 709/226 |
| 2018/0357291 A1* | 12/2018 | Choi | G06F 16/2379 |
| 2021/0157631 A1* | 5/2021 | Manteck | G06F 9/468 |
| 2021/0271715 A1* | 9/2021 | Bastide | G06F 9/546 |

* cited by examiner

DATABASE ACCESS REQUEST PROCESSING DISTRIBUTION

BACKGROUND

Technical Field

This description relates to database access request processing distribution.

Background

Radio Access Networks (RAN) utilizing Open RAN (O-RAN), where the interfaces and protocols between the RAN components are open and interoperable, have emerged. Open RAN splits the functions of an access point of a cell site among a central unit (CU), a distributed unit (DU), and a radio unit (RU). In some O-RAN systems, instances of a CU and a DU exist as applications executed in a cloud native environment.

SUMMARY

According to at least some embodiments of the subject disclosure, database access request processing distribution is performed by receiving requests from a plurality of worker servers, the requests including database access requests, and maintaining a queue of the requests. Queues are maintained by adding each request to a queue in response to receiving the request, assigning, for each request, a master server among a plurality of master servers to process the request, and removing each request from the queue in response to processing of the request. The assigning includes assigning the first master server among the plurality of master servers to process the database access requests until the database access requests in the queue exceed a first threshold, and then distributing assignments to process the database access requests among the plurality of master servers.

Some embodiments include the instructions in a computer program, the method performed by the processor executing the instructions of the computer program, and an apparatus that performs the method. In some embodiments, the apparatus includes a controller including circuitry configured to perform the operations in the instructions.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

To execute a CU application or a DU application in a cloud native environment, the application is divided into micro-services, each micro-service performing a network function, and each micro-service is provisioned in a container on a server in the cloud native environment. For example, KUBERNETES is a popular platform for orchestrating containers in cloud native environments. A micro-service provisioned in a container on in a cloud native environment is referred to as a Network Function Virtualization (NFV) or a Cloud Network Function (CNF).

In some O-RAN systems, the cloud environment that deploys CNF-based applications includes three types of data centers: a central data center, a regional data center, and an edge data center. Some data centers include bare metal servers. In some data centers the bare metal servers cooperate as one or more master servers and several worker servers. In some data centers, the current state of each application deployed on a worker server is stored in a database. The current state may be represented as an active or running state, an idle state, an error state, an "insufficient resources" state, etc. Some databases for storing application states use Structured Query Language (SQL), such as PGSQL, etc. In some data centers, the worker servers access the database via the master nodes by transmitting requests via an orchestrator client.

In some data centers, the master server of a data center is configured to process requests from the worker servers. Among the requests, some requests are for outgoing communication, and some requests are to update the database, such as to store the current state. In some data centers with multiple master servers, only one master server processes requests from the worker servers while the other master servers remain idle. If the active master server fails, then one of the other master servers will begin processing the requests from the worker servers. In order to reduce downtime in the event of failure of the active master server, the other master servers are already authenticated to communicate with the database storing application states in some data centers.

Certain events cause the worker servers to generate many database access requests. In some cases, the number, rate of generation, or proportion of requests is so high that applications may not be able to start for several minutes. Outages within an O-RAN may occur until the CNF-based applications can start. For example, an update of the KUBERNETES platform may cause such an event.

According to at least some embodiments of the subject disclosure, an apparatus is configured to utilize inactive master servers to distribute the processing of database access requests. In at least some embodiments, the apparatus assigns all requests from worker servers, including outgoing transmission requests and database access requests, to the active master server until the database access requests exceed a threshold. In response to the database access requests exceeding a threshold, the apparatus of at least some embodiments begins distributing assignment of the database access requests among all of the master servers.

Figure 1:
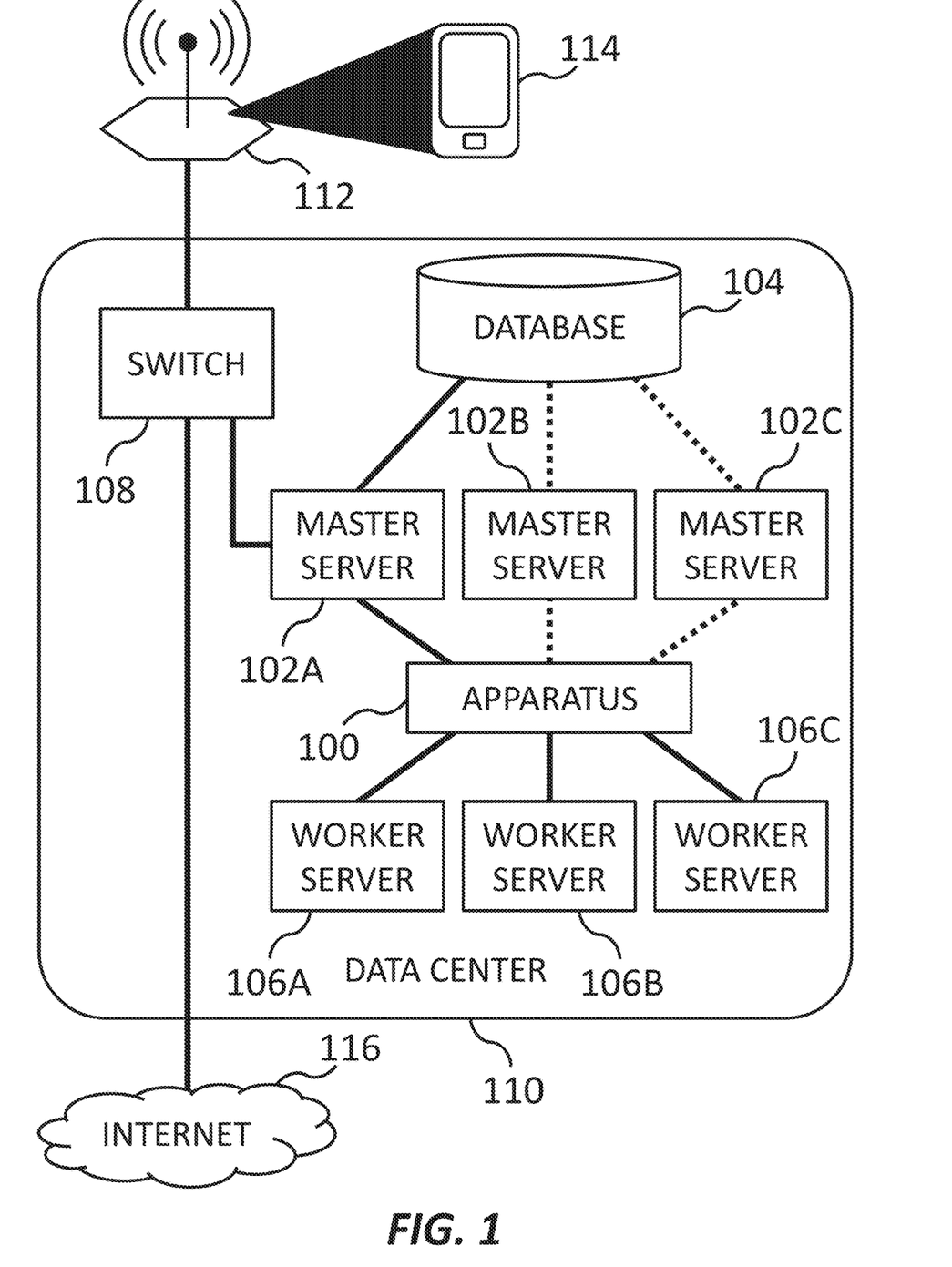
FIG. 1 is a schematic diagram of a system for database access request processing distribution, according to at least some embodiments of the subject disclosure.

FIG. 1 is a schematic diagram of a system for database access request processing distribution, according to at least some embodiments of the subject disclosure. The system includes a data center 110 and an access point 112. In at least some embodiments, the system enables communication between a terminal 114 and an internet 116. In at least some embodiments, data center 110 is part of a radio access network, which is a wireless communication network including access points, such as access point 112. In at least some embodiments, the radio access network is configured to operate under 4G standards, 5G standards, or any other wide area radio access network protocol. In at least some embodiments, data center 110 is a CU connected to a plurality of DUs. In at least some embodiments, data center 110 is a DU connected to a plurality of access points, such as access point 112.

Data center 110 includes an apparatus 100, a plurality of master servers, which includes master servers 102A, 102B, and 102C, a database 104, a plurality of worker servers, which includes worker servers 106A, 106B, and 106C, and a switch 108. In at least some embodiments, data center 110 is part of a cloud native environment. In at least some embodiments, each worker server, such as worker server 106A, executes one or more CU applications configured to facilitate communication through the radio access network. In at least some embodiments, each worker server, such as worker server 106A, executes one or more DU applications configured to facilitate communication through the radio access network. In at least some embodiments, communication between a given terminal, such as terminal 114, and internet 116 is facilitated by a given worker server, such as worker server 106A, in which the communication between terminal 114 and internet 116 is routed through worker server 106A. In at least some embodiments, communication of the plurality of worker servers is routed through master server 102A. In at least some embodiments, data center 110 includes 3 master servers and 45 worker servers. In at least some embodiments, each master server and worker server of data center 110 operates using a container management platform, such as KUBERNETES.

Apparatus 100 is in communication with each master server among the plurality of master servers. Apparatus 100 is also in communication with each worker server among the plurality of worker servers. Apparatus 100 is configured for database access request processing distribution. In at least some embodiments, apparatus 100 includes a non-transitory computer-readable medium including instructions executable by a processor to cause the processor to perform operations for database access request processing distribution. In at least some embodiments, apparatus 100 is configured to perform the operation flow shown in FIG. 2, which will be explained hereinafter. In at least some embodiments, apparatus 100 is a bare metal server. In at least some embodiments, apparatus 100 is an application executed on a bare metal server along with other applications. In at least some embodiments, apparatus 100 is configured to receive requests from the plurality of worker servers and maintain a queue of requests. In at least some embodiments, apparatus 100 is configured to assign all requests to master server 102A until certain conditions are met. In at least some embodiments, apparatus 100 is configured to assign all requests to master server 102B in response to master server 102A incurring an error, fault, or other issue rendering master server 102A unable to process requests in an acceptable manner. In at least some embodiments, apparatus 100 is configured to distribute processing of database access requests among the plurality of master servers in response to database access requests in the queue exceeding a threshold.

Database 104 is in communication with each master server among the plurality of master servers, which includes master servers 102A, 102B, and 102C. In at least some embodiments, database 104 is configured to store application states. In at least some embodiments, database 104 is configured to use Structured Query Language (SQL), such as PGSQL, etc. In at least some embodiments, each master server among the plurality of master servers is authenticated to submit requests to database 104, such as requests to store application states.

Switch 108 is in communication with master server 102A. In at least some embodiments, switch 108 is configured to transmit outgoing packets from data center 110 and receive incoming packets from terminal 114 and internet 116. In at least some embodiments, all communication to and from data center 110 is routed through switch 108.

In at least some embodiments, each server among the master servers and worker servers is a computation device capable of executing instructions to perform operations, such as operations for facilitating communication through the radio access network. In at least some embodiments, each worker server includes a non-transitory computer-readable medium including instructions executable by a processor to cause the processor to perform dynamic allocation of computational resources to application microservices.

Terminal 114 is in wireless communication with access point 112 through a wide area radio access network protocol, such as 4G standard, 5G standard, etc. In at least some embodiments, terminal 114 is a device having limited computational resources, such as a smart watch, a fitness tracker, and Internet-of-Things (IoT) device, etc., or a device having computational resources for a broader range of capabilities, such as a smart phone, a tablet, a personal computer, etc.

Figure 2:
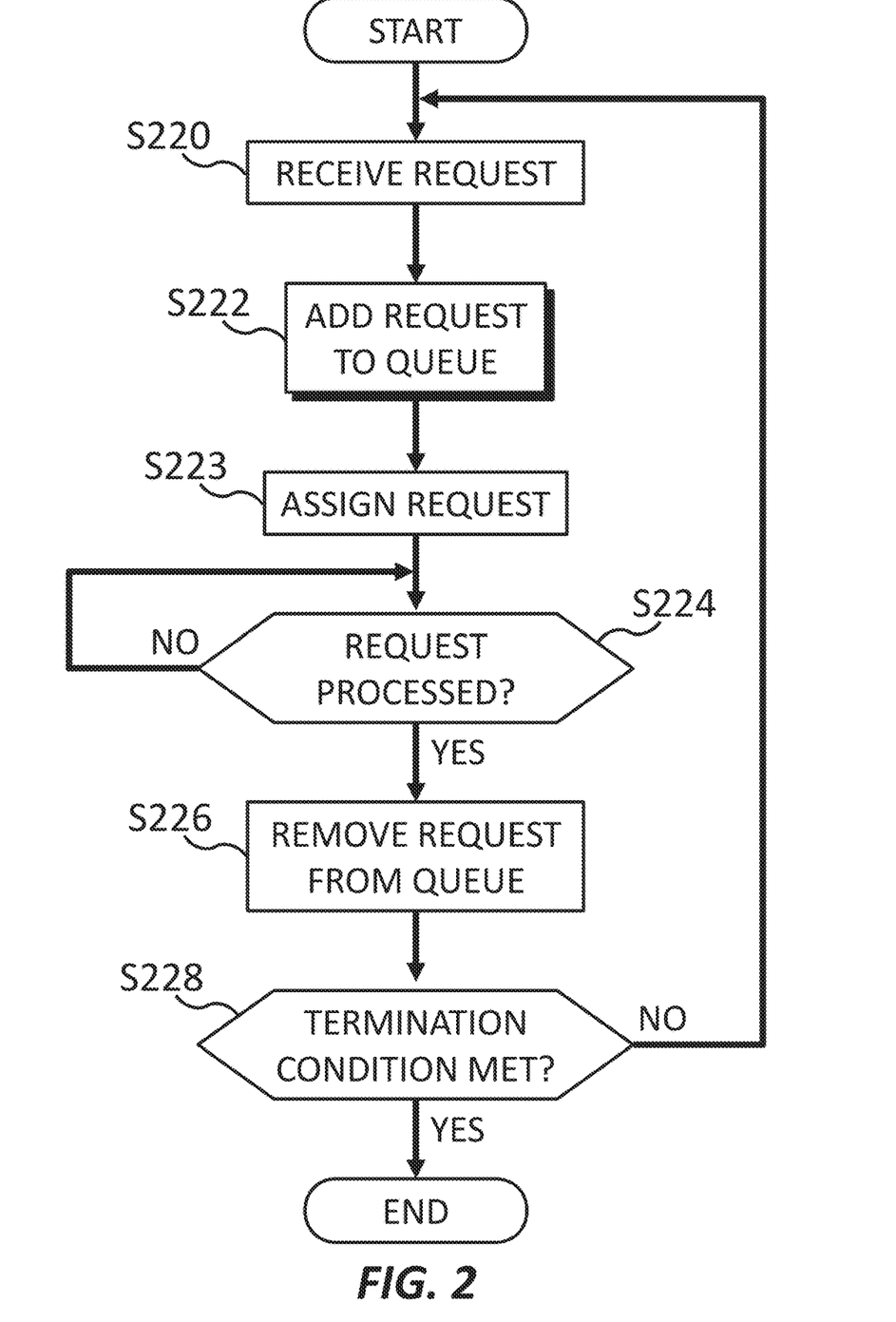
FIG. 2 is an operational flow for database access request processing distribution, according to at least some embodiments of the subject disclosure.

FIG. 2 is an operational flow for database access request processing distribution, according to at least some embodiments of the subject disclosure. The operational flow provides a method of database access request processing distribution. In at least some embodiments, the method is performed by a controller of an apparatus including sections for performing certain operations, such as the controller and apparatus shown in FIG. 5, which will be explained hereinafter.

At S220, a receiving section of the controller receives a request. In at least some embodiments, the receiving section receives a request from a worker server of a data center. In at least some embodiments, the receiving section receives a database access request. In at least some embodiments, the receiving section receives an outgoing transmission request. In at least some embodiments, as iterations of the operational flow of FIG. 2 proceed, the receiving section receives requests from a plurality of worker servers, the requests including database access requests and outgoing transmission requests. In at least some embodiments, the requests from the plurality of workers further include internal state change requests. In at least some embodiments, the database access request is a request to update a state of a CNF-based application executed by the worker server. In at least some embodiments, the worker server requests a state update for persistence.

At S222, an adding section of the controller adds the request to the queue. In at least some embodiments, as iterations of the operational flow of FIG. 2 proceed, the adding section adds each request to a queue in response to receiving the request. In at least some embodiments, the adding section stores information describing each queue in local storage. In at least some embodiments, the local storage is volatile memory. In at least some embodiments, the adding section stores one or more of, for each request, an identifier of a worker server originating the request, an indicator of a type of the request, one or more parameters of the request, a substantive content of the request, a target or recipient of the request, or any other information relevant for processing the request. In at least some embodiments, the adding section designates space in the local storage for an identifier of an assigned master server.

At S223, an assigning section of the controller assigns the request. In at least some embodiments, the assigning section assigns the request to a master server among a plurality of master servers in the data center. In at least some embodiments, the assigning section assigns a master server among a plurality of master servers to process the request. In at least some embodiments, the assigning section performs the operational flow shown in FIG. 3, which will be explained hereinafter. In at least some embodiments, the assigning section performs the assigning before the adding section adds the request to the queue.

At S224, the controller or a section thereof determines whether the request has been processed. In at least some embodiments, the controller receives an indication from a master server that the request processing is complete. In at least some embodiments, retrieval of the request from the queue by a master server is an indication that the request has been processed. If the controller determines that the request has been processed, then the operational flow proceeds to request removal at S226. If the controller determines that the request has been processed, then the operational flow returns to request processing determination at S224.

At S226, a removing section of the controller removes the request from the queue. In at least some embodiments, the removing section removes the request from the queue in response to retrieval of the request by a master server. In at least some embodiments, the removing section removes the request from the queue in the same operation as the retrieval of the request by a master server. In at least some embodiments, as iterations of the operational flow of FIG. 2 proceed, the removing section removes each request from the queue in response to processing of the request.

At S228, the controller or a section thereof determines whether a termination condition has been met. In at least some embodiments, the controller receives an instruction to terminate in the form of an instruction to restart the apparatus, to refresh the apparatus or the queue, etc. In at least some embodiments, the termination condition is a predetermined ending time or duration. If the controller determines that the termination condition has not been met, then the operational flow returns to request reception at S220. If the controller determines that the termination condition has been met, then the operational flow ends.

In at least some embodiments, the controller performs the operational flow of FIG. 2 in parallel instances, one instance for each request. In at least some embodiments, the controller performs the operations of request addition at S222 and request removal at S226 as part of queue maintenance. In at least some embodiments, the controller maintains a queue of the requests by adding each request to a queue in response to receiving the request, assigning, for each request, a master server among a plurality of master servers to process the request, and removing each request from the queue in response to processing of the request.

Figure 3:
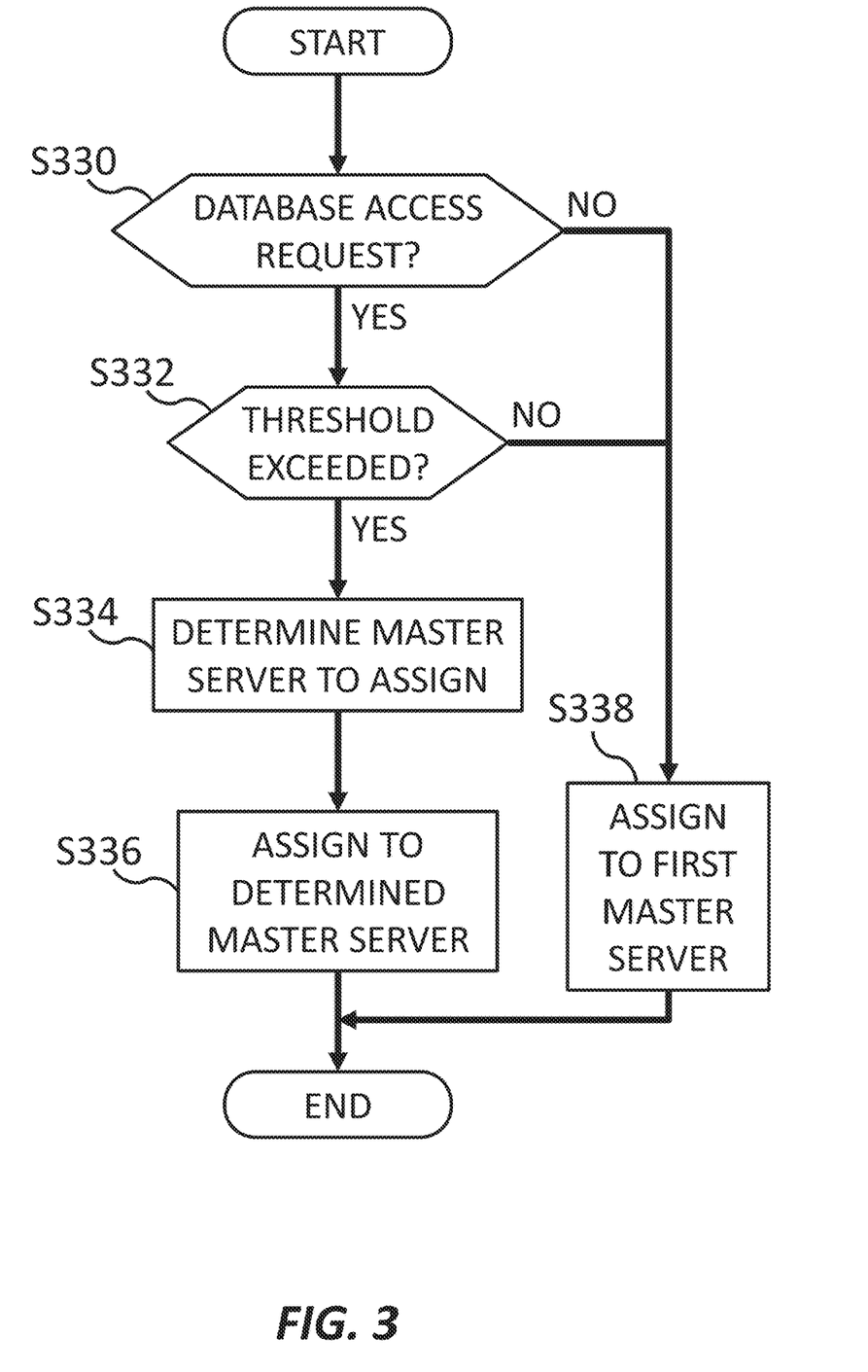
FIG. 3 is an operational flow for assigning a request, according to at least some embodiments of the subject disclosure.

FIG. 3 is an operational flow for assigning a request, according to at least some embodiments of the subject disclosure. The operational flow provides a method of request assignment. In at least some embodiments, the method is performed by an assigning section of an apparatus, such as the apparatus shown in FIG. 5, which will be explained hereinafter.

At S330, the assigning section or a sub-section thereof determines whether a request is a database access request. In at least some embodiments, a database access request is any request that instructs a master server to communicate with a database. In at least some embodiments, a database access request is any request that instructs a master server to write to a database. If the assigning section determines that the request is a database access request, then the operational flow proceeds to first threshold determination at S332. If the assigning section determines that the request is not a database access request, then the operational flow proceeds to first master server assignment at S338.

At S332, the assigning section or a sub-section thereof determines whether a threshold has been exceeded. In at least some embodiments, the threshold is exceeded when the database access requests in the queue exceed a threshold value. In at least some embodiments, the assigning section determines whether a first threshold has been exceeded. In at least some embodiments, a first threshold represents a proportion of a number of database access requests in the queue to a number of requests in the queue. In at least some embodiments, the first threshold represents a number of database access requests in the queue. In at least some embodiments, the first threshold represents a number of database access requests added to the queue in a time period. If the assigning section determines that the first threshold has been exceeded, then the operational flow proceeds to master server determination at S334. If the assigning section determines that the first threshold has been exceeded, then the operational flow proceeds to first master server assignment at S338.

In at least some embodiments, the operation at S332 operates according to a different threshold in response to an iteration in which the assigning section determines that the threshold has been exceeded following an iteration in which the assigning section determines that the first threshold has not been exceeded. In at least some embodiments, once the first threshold has been exceeded, in subsequent iterations, the operation at S332 determines whether a second threshold has been exceeded. In at least some embodiments, the second threshold is lower than the first threshold. In at least some embodiments, the operation at S332 adjusts operation in order to prevent the master server assignment determination from shifting back and forth from iteration to iteration. In at least some embodiments, the operation at S332 lowers the threshold so that once the operational flow proceeds to S334 instead of S338, subsequent iterations are more likely to also proceed to S334 instead of S338. Similarly, in at least some embodiments, the operation at S332 resumes operation according to the first threshold in response to an iteration in which the assigning section determines that the first threshold has not been exceeded following an iteration in which the assigning section determines that the first threshold has been exceeded.

At S334, the assigning section or a sub-section thereof determines the master server to assign. In at least some embodiments, the assigning section determines which master server among the plurality of master servers to assign to process the database access request. In at least some embodiments, as iterations of S334 proceed, the assigning section distributes assignments to process the database access requests among the plurality of master servers in response to the database access requests in the queue exceeding the first threshold. In at least some embodiments, the assigning section determines which master server among the plurality of master servers to assign based on a load balancing scheme. In at least some embodiments, the load balancing scheme instructs the assigning section to balance the number of requests assigned to each master server, such that each master server is assigned a substantially equal number of requests. Because assignment of a single request cannot be divided, the number of requests among master servers would not actually be equal unless the number of requests is an even multiple of the number of master servers. In at least some embodiments, the load balancing scheme instructs the assigning section to determine which master server among the plurality of master servers is assigned fewest requests in the queue. In at least some embodiments, the load balancing scheme instructs the assigning section to assign the first master server among the plurality of master servers to process fewer database access requests than any other master server among the plurality of master servers. In at least some embodiments, the load balancing scheme instructs the assigning section to assign the first master server, which is the master server assigned to process requests other than database access requests, to process a number of database access requests representing 10% of the requests in the queue, and assigning the other master servers among the plurality of master servers a number of database access requests representing an even division of the remaining database access requests in the queue.

At S336, the assigning section or a sub-section thereof assigns the determined master server. In at least some embodiments, the assigning section assigns the determined master server among the plurality of master servers to process the database access request. In at least some embodiments, as iterations of S336 proceed, the assigning section distributes assignments to process the database access requests among the plurality of master servers in response to the database access requests in the queue exceeding the first threshold. In at least some embodiments, the assigning section retrieves the identifier of the master server determined at S334. In at least some embodiments, the assigning section completes the process of adding the request to the queue with the identifier of the assigned master server. In at least some embodiments, the assigning section updates the request in the queue with the identifier of the assigned master server.

At S338, the assigning section or a sub-section thereof assigns the first master server. In at least some embodiments, the assigning section assigns the first master server to process the request. In at least some embodiments, as iterations of S338 proceed, the assigning section assigns the first master server to process all requests other than database access requests at least until the first master server incurs an error, fault, or other issue rendering the first master server unable to process requests in an acceptable manner. In at least some embodiments, as iterations of S338 proceed, the assigning section assigns the first master server among the plurality of master servers to process the outgoing transmission requests. In at least some embodiments, as iterations of S338 proceed, the assigning section assigns the first master server among the plurality of master servers to process the database access requests until the database access requests in the queue exceed a first threshold. In at least some embodiments, as iterations of S338 proceed, the assigning section assigns the first master server among the plurality of master servers to process the internal state change requests. In at least some embodiments where the operation at S332 operates according to different thresholds, the assigning section assigns the first master server among the plurality of master servers to process the database access requests in response to the database access requests in the queue falling below a second threshold while distributing assignments.

Figure 4:
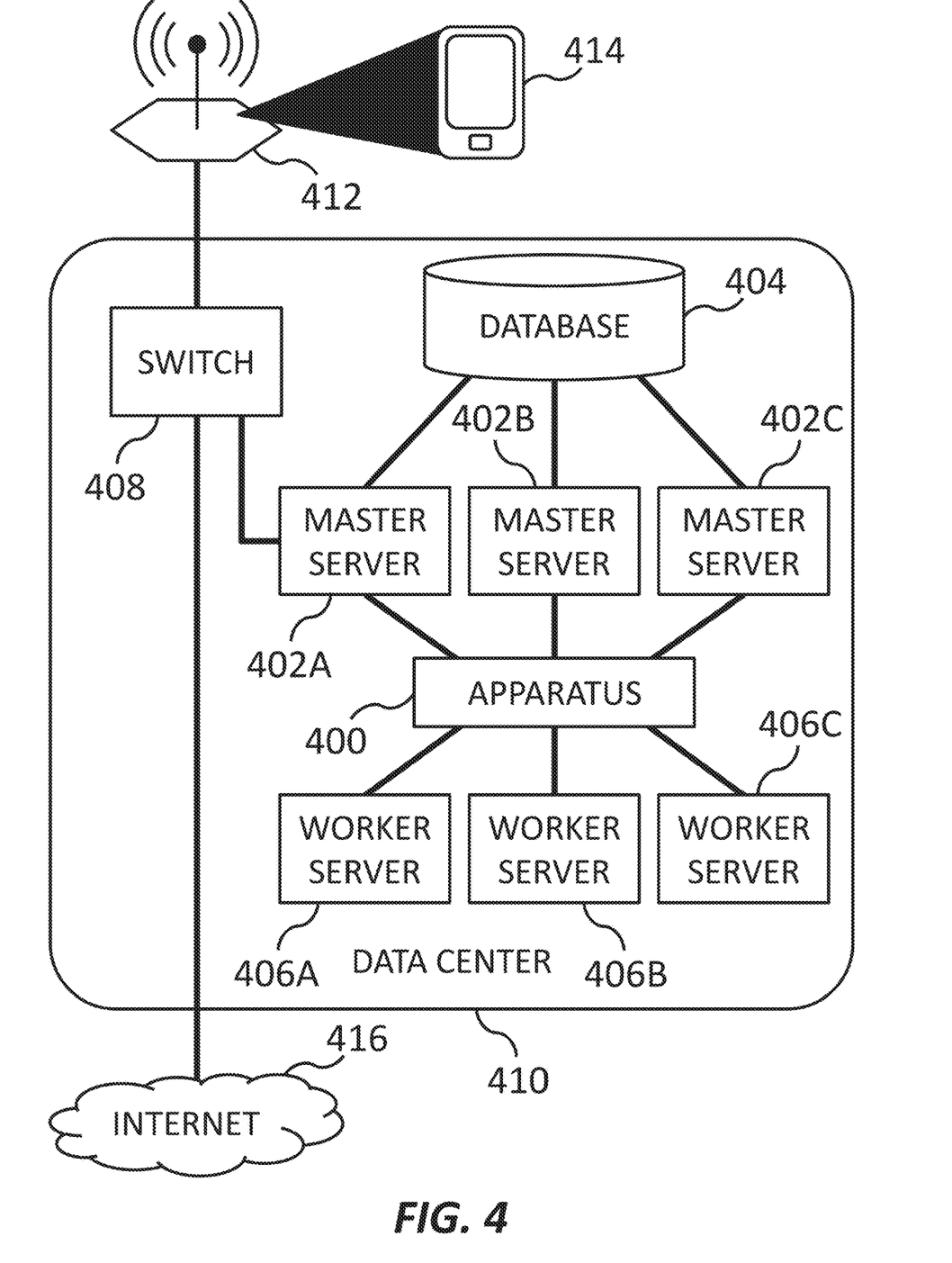
FIG. 4 is a schematic diagram of a system distributing the processing of database access requests, according to at least some embodiments of the subject disclosure.

FIG. 4 is a schematic diagram of a system distributing the processing of database access requests, according to at least some embodiments of the subject disclosure. The system includes a data center 410 and an access point 412. In at least some embodiments, the system enables communication between a terminal 414 and an internet 416. Data center 410 includes an apparatus 400, a plurality of master servers, which includes master servers 402A, 402B, and 402C, a database 404, a plurality of worker servers, which includes worker servers 406A, 406B, and 406C, and a switch 408.

The structure and function of apparatus 400, the plurality of master servers including master servers 402A, 402B, and 402C, database 404, the plurality of worker servers including worker servers 406A, 406B, and 406C, switch 408, data center 410, access point 412, terminal 414, and internet 416 are substantially equivalent to the structure and function of apparatus 100, the plurality of master servers including master servers 102A, 102B, and 102C, database 104, the plurality of worker servers including worker servers 106A, 106B, and 106C, switch 108, data center 110, access point 112, terminal 114, and internet 116 of FIG. 1, respectively.

In this embodiment, the database access requests in the queue have exceeded the first threshold, and apparatus 400 is distributing assignments to process the database access requests among the plurality of master servers. In at least some embodiments, apparatus 400 determines which master server among the plurality of master servers to assign based on a load balancing scheme. In at least some embodiments, under the load balancing scheme, apparatus 400 balances the number of requests assigned to each master server, such that each of master server 402A, master server 402B, and master server 402C is assigned a substantially equal number of requests. In at least some embodiments, under the load balancing scheme, apparatus 400 determines which master server among the plurality of master servers is assigned fewest requests in the queue. In at least some embodiments, under the load balancing scheme, if apparatus 400 determines that master server 402A is currently assigned 12 outgoing transmission requests, 4 internal state change requests, and 3 database access requests, that master server 402B is currently assigned 20 database access requests, and that master server 402C is currently assigned 20 database access requests, then apparatus 400 will assign the master server 402A to process the next database access request. In this example, master server 402A is currently assigned to 19 total requests, which is less than the 20 total requests assigned to each of master server 402B and master server 402C. By assigning the next database access request to master server 402A, resulting in each master server being currently assigned to 20 total requests, apparatus 400 is effectively balancing the request load among the plurality of master servers. In at least some embodiments, under the load balancing scheme, apparatus 100 assigns master server 402A to process fewer database access requests than any other master server among the plurality of master servers. In at least some embodiments, under the load balancing scheme, apparatus 400 assigns the master server 402A, which is the master server assigned to process requests other than database access requests, to process a number of database access requests representing 10% of the requests in the queue, and assigning master server 402B and master server 402C a number of database access requests representing an even division of the remaining database access requests in the queue.

Figure 5:
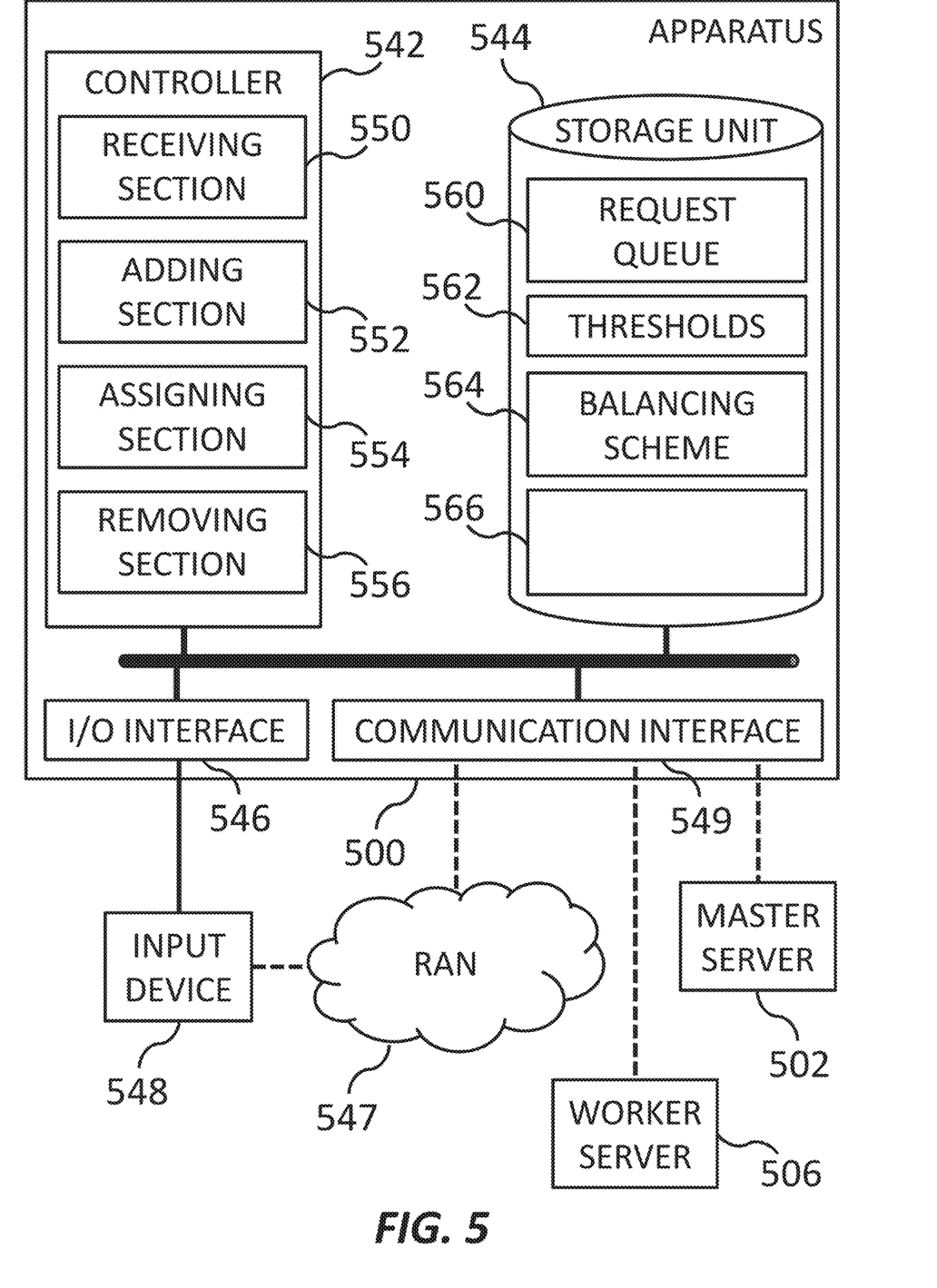
FIG. 5 is a block diagram of a hardware configuration for database access request processing distribution, according to at least some embodiments of the subject disclosure.

FIG. 5 is a block diagram of a hardware configuration for database access request processing distribution, according to at least some embodiments of the subject disclosure.

The exemplary hardware configuration includes apparatus 500, which communicates with radio access network 547, master server 502, and work server 506, and interacts with input device 548 either directly or through radio access network 547. In at least some embodiments, apparatus 500 is a computer or other computing device that receives input or commands from input device 548. In at least some embodiments, apparatus 500 is integrated with input device 548. In at least some embodiments, apparatus 500 is a computer system that executes computer-readable instructions to perform operations for database access request processing distribution.

Apparatus 500 includes a controller 542, a storage unit 544, an input/output interface 546, and a communication interface 549. In at least some embodiments, controller 542 includes a processor or programmable circuitry executing instructions to cause the processor or programmable circuitry to perform operations according to the instructions. In at least some embodiments, controller 542 includes analog or digital programmable circuitry, or any combination thereof. In at least some embodiments, controller 542 includes physically separated storage or circuitry that interacts through communication. In at least some embodiments, storage unit 544 includes a non-volatile computer-readable medium capable of storing executable and non-executable data for access by controller 542 during execution of the instructions. Communication interface 549 transmits and receives data from radio access network 547. Input/output interface 546 connects to various input and output units, such as input device 548, via a parallel port, a serial port, a keyboard port, a mouse port, a monitor port, and the like to accept commands and present information. In some embodiments, storage unit 544 is external from apparatus 500.

Controller 542 includes receiving section 550, adding section 552, assigning section 554, and removing section 556. Storage unit 544 includes request queue 560, thresholds 562, balancing schemes 564, and server identifiers 566.

Receiving section 550 is the circuitry or instructions of controller 542 configured to receive requests. In at least some embodiments, receiving section 550 is configured to receive requests from a plurality of worker servers, the requests including database access requests and outgoing transmission requests. In at least some embodiments, receiving section 550 utilizes information in storage unit 544, such as server identifiers. In at least some embodiments, receiving section 550 includes sub-sections for performing additional functions, as described in the foregoing flow charts. In at least some embodiments, such sub-sections are referred to by a name associated with a corresponding function.

Adding section 552 is the circuitry or instructions of controller 542 configured to add requests to a queue. In at least some embodiments, adding section 552 is configured to add each request to a queue in response to receiving the request. In at least some embodiments, receiving section 550 utilizes information in storage unit 544, such as server identifiers, and records information to storage unit 544, such as in request queue 560. In at least some embodiments, adding section 552 includes sub-sections for performing additional functions, as described in the foregoing flow charts. In at least some embodiments, such sub-sections are referred to by a name associated with a corresponding function.

Assigning section 554 is the circuitry or instructions of controller 542 configured to assign master servers to process requests. In at least some embodiments, assigning section 554 is configured to assign the first master server among the plurality of master servers to process the database access requests until the database access requests in the queue exceed a first threshold, and to distribute assignments to process the database access requests among the plurality of master servers in response to the database access requests in the queue exceeding the first threshold. In at least some embodiments, assigning section 554 utilizes information from storage unit 544, such as request queue 560, thresholds 562, and balancing schemes 564, and records information to storage unit 544, such as in request queue 560. In at least some embodiments, assigning section 554 includes sub-sections for performing additional functions, as described in the foregoing flow charts. In at least some embodiments, such sub-sections are referred to by a name associated with a corresponding function.

Removing section 556 is the circuitry or instructions of controller 542 configured to remove requests from the queue. In at least some embodiments, removing section 556 is configured to remove each request from the queue in response to processing of the request. In at least some embodiments, removing section 556 utilizes information from storage unit 544, such as server identifiers, and records information to storage unit 544, such as in request queue 560. In at least some embodiments, removing section 556 includes sub-sections for performing additional functions, as described in the foregoing flow charts. In at least some embodiments, such sub-sections are referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2) sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the user's computer, partly on the user's computer, as a stand-alone software package, partly on the user's computer and partly on a remote computer or entirely on the remote computer or server. In at least some embodiments, in the latter scenario, the remote computer is connected to the user's computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the subject disclosure.

While embodiments of the subject disclosure have been described, the technical scope of any subject matter claimed is not limited to the above-described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

Accordingly, at least some embodiments of the subject disclosure are outlined by the scope of the following Supplemental Notes.

Supplemental Note 1

A non-transitory computer-readable medium includes instructions executable by a processor to cause the processor to perform operations for database access request processing distribution. The operations comprise receiving requests from a plurality of worker servers, the requests including database access requests and outgoing transmission requests, and maintaining a queue of the requests. The queue of the requests is maintained by adding each request to a queue in response to receiving the request, assigning, for each request, a master server among a plurality of master servers to process the request, and removing each request from the queue in response to processing of the request. The assigning includes assigning a first master server among the plurality of master servers to process the outgoing transmission requests, assigning the first master server among the plurality of master servers to process the database access requests until the database access requests in the queue exceed a first threshold, and distributing assignments to process the database access requests among the plurality of master servers in response to the database access requests in the queue exceeding the first threshold.

Supplemental Note 2

In the computer-readable medium of Supplemental Note 1, the first threshold is one of a proportion of a number of database access requests in the queue to a number of requests in the queue, a number of database access requests in the queue, or a number of database access requests added to the queue in a time period.

Supplemental Note 3

In the computer-readable medium of Supplemental Note 1 or 2, the distributing includes assigning the first master server among the plurality of master servers to process fewer database access requests than any other master server among the plurality of master servers.

Supplemental Note 4

In the computer-readable medium of any one of Supplemental Notes 1-3, the distributing includes, for each database access request, determining which master server among the plurality of master servers to assign based on a load balancing scheme, and assigning the determined master server among the plurality of master servers to process the database access request.

Supplemental Note 5

In the computer-readable medium of Supplemental Note 4, the determining includes, for each database access request, determining which master server among the plurality of master servers is assigned fewest requests in the queue.

Supplemental Note 6

In the computer-readable medium of any one of Supplemental Notes 1-5, the assigning includes assigning the first master server among the plurality of master servers to process the database access requests in response to the database access requests in the queue falling below a second threshold while distributing assignments. The second threshold is lower than the first threshold.

Supplemental Note 7

In the computer-readable medium of any one of Supplemental Notes 1-6, the requests from the plurality of workers further include internal state change requests. The assigning includes assigning the first master server among the plurality of master servers to process the internal state change requests.

Supplemental Note 8

A method of database access request processing distribution comprises receiving requests from a plurality of worker servers, the requests including database access requests and outgoing transmission requests, and maintaining a queue of the requests. The queue of the requests is maintained by adding each request to a queue in response to receiving the request, assigning, for each request, a master server among a plurality of master servers to process the request, and removing each request from the queue in response to processing of the request. The assigning includes assigning a first master server among the plurality of master servers to process the outgoing transmission requests, assigning the first master server among the plurality of master servers to process the database access requests until the database access requests in the queue exceed a first threshold, and distributing assignments to process the database access requests among the plurality of master servers in response to the database access requests in the queue exceeding the first threshold.

Supplemental Note 9

In the method of Supplemental Note 8, the first threshold is one of a proportion of a number of database access requests in the queue to a number of requests in the queue, a number of database access requests in the queue, or a number of database access requests added to the queue in a time period.

Supplemental Note 10

In the method of Supplemental Note 8 or 9, the distributing includes assigning the first master server among the plurality of master servers to process fewer database access requests than any other master server among the plurality of master servers.

Supplemental Note 11

In the method of any one of Supplemental Notes 8-10, the distributing includes, for each database access request, determining which master server among the plurality of master servers to assign based on a load balancing scheme, and assigning the determined master server among the plurality of master servers to process the database access request.

Supplemental Note 12

In the method of Supplemental Note 11, the determining includes, for each database access request, determining which master server among the plurality of master servers is assigned fewest requests in the queue.

Supplemental Note 13

In the method of any one of Supplemental Notes 8-12, the assigning includes assigning the first master server among the plurality of master servers to process the database access requests in response to the database access requests in the queue falling below a second threshold while distributing assignments. The second threshold is lower than the first threshold.

Supplemental Note 14

In the method of any one of Supplemental Notes 8-13, the requests from the plurality of workers further include internal state change requests. The assigning includes assigning the first master server among the plurality of master servers to process the internal state change requests.

Supplemental Note 15

An apparatus for database access request processing distribution comprises a controller including circuitry. The circuitry is configured to receive requests from a plurality of worker servers, the requests including database access requests and outgoing transmission requests, and maintain a queue of the requests. The queue of the requests is maintained by adding each request to a queue in response to receiving the request, assigning, for each request, a master server among a plurality of master servers to process the request, and removing each request from the queue in response to processing of the request. The assigning includes assigning a first master server among the plurality of master servers to process the outgoing transmission requests, assigning the first master server among the plurality of master servers to process the database access requests until the database access requests in the queue exceed a first threshold, and distributing assignments to process the database access requests among the plurality of master servers in response to the database access requests in the queue exceeding the first threshold.

Supplemental Note 16

In the apparatus of Supplemental Note 15, the first threshold is one of a proportion of a number of database access requests in the queue to a number of requests in the queue, a number of database access requests in the queue, or a number of database access requests added to the queue in a time period.

Supplemental Note 17

In the apparatus of Supplemental Note 15 or 16, the distributing includes assigning the first master server among the plurality of master servers to process fewer database access requests than any other master server among the plurality of master servers.

Supplemental Note 18

In the apparatus of any one of Supplemental Notes 15-17, the distributing includes, for each database access request, determining which master server among the plurality of master servers to assign based on a load balancing scheme, and assigning the determined master server among the plurality of master servers to process the database access request.

Supplemental Note 19

In the apparatus of Supplemental Note 18, the determining includes, for each database access request, determining which master server among the plurality of master servers is assigned fewest requests in the queue.

Supplemental Note 20

In the apparatus of any one of Supplemental Notes 15-19, the assigning includes assigning the first master server among the plurality of master servers to process the database access requests in response to the database access requests in the queue falling below a second threshold while distributing assignments. The second threshold is lower than the first threshold.

What is claimed is:

1. A non-transitory computer-readable medium including instructions executable by a processor to cause the processor to perform operations comprising:
   receiving requests from a plurality of worker servers, the requests including database access requests and outgoing transmission requests; and
   maintaining a queue of the requests by
      adding each request to a queue in response to receiving the request,
      assigning, for each request, a master server among a plurality of master servers to process the request, wherein the assigning includes:
         assigning a first master server among the plurality of master servers to process the outgoing transmission requests,
         assigning the first master server among the plurality of master servers to process the database access requests until the database access requests in the queue exceed a first threshold, and
         distributing assignments to process the database access requests among the plurality of master servers in response to the database access requests in the queue exceeding the first threshold, and
      removing each request from the queue in response to processing of the request.

2. The computer-readable medium of claim 1, wherein the first threshold is one of
   a proportion of a number of database access requests in the queue to a number of requests in the queue,
   a number of database access requests in the queue, or
   a number of database access requests added to the queue in a time period.

3. The computer-readable medium of claim 1, wherein the distributing includes
   assigning the first master server among the plurality of master servers to process fewer database access requests than any other master server among the plurality of master servers.

4. The computer-readable medium of claim 1, wherein the distributing includes, for each database access request,
   determining which master server among the plurality of master servers to assign based on a load balancing scheme, and
   assigning the determined master server among the plurality of master servers to process the database access request.

5. The computer-readable medium of claim 4, wherein the determining includes, for each database access request,
   determining which master server among the plurality of master servers is assigned fewest requests in the queue.

6. The computer-readable medium of claim 1, wherein
   the assigning includes assigning the first master server among the plurality of master servers to process the database access requests in response to the database access requests in the queue falling below a second threshold while distributing assignments, and
   the second threshold is lower than the first threshold.

7. The computer-readable medium of claim 1, wherein
   the requests from the plurality of workers further include internal state change requests, and
   the assigning includes assigning the first master server among the plurality of master servers to process the internal state change requests.

8. A method comprising:
   receiving requests from a plurality of worker servers, the requests including database access requests and outgoing transmission requests; and
   maintaining a queue of the requests by
      adding each request to a queue in response to receiving the request,
      assigning, for each request, a master server among a plurality of master servers to process the request, wherein the assigning includes:
         assigning a first master server among the plurality of master servers to process the outgoing transmission requests,
         assigning the first master server among the plurality of master servers to process the database access requests until the database access requests in the queue exceed a first threshold, and
         distributing assignments to process the database access requests among the plurality of master servers in response to the database access requests in the queue exceeding the first threshold, and
      removing each request from the queue in response to processing of the request.

9. The method of claim 8, wherein the first threshold is one of
   a proportion of a number of database access requests in the queue to a number of requests in the queue,
   a number of database access requests in the queue, or
   a number of database access requests added to the queue in a time period.

10. The method of claim 8, wherein the distributing includes
   assigning the first master server among the plurality of master servers to process fewer database access requests than any other master server among the plurality of master servers.

11. The method of claim 8, wherein the distributing includes, for each database access request, determining which master server among the plurality of master servers to assign based on a load balancing scheme, and assigning the determined master server among the plurality of master servers to process the database access request.

12. The method of claim 11, wherein the determining includes, for each database access request, determining which master server among the plurality of master servers is assigned fewest requests in the queue.

13. The method of claim 8, wherein the assigning includes assigning the first master server among the plurality of master servers to process the database access requests in response to the database access requests in the queue falling below a second threshold while distributing assignments, and the second threshold is lower than the first threshold.

14. The method of claim 8, wherein the requests from the plurality of workers further include internal state change requests, and the assigning includes assigning the first master server among the plurality of master servers to process the internal state change requests.

15. An apparatus comprising:

a controller including circuitry configured to:

receive requests from a plurality of worker servers, the requests including database access requests and outgoing transmission requests; and maintain a queue of the requests by adding each request to a queue in response to receiving the request, assigning, for each request, a master server among a plurality of master servers to process the request, wherein the assigning includes:

assigning a first master server among the plurality of master servers to process the outgoing transmission requests, assigning the first master server among the plurality of master servers to process the database access requests until the database access requests in the queue exceed a first threshold, and distributing assignments to process the database access requests among the plurality of master servers in response to the database access requests in the queue exceeding the first threshold, and removing each request from the queue in response to processing of the request.

16. The apparatus of claim 15, wherein the first threshold is one of a proportion of a number of database access requests in the queue to a number of requests in the queue, a number of database access requests in the queue, or a number of database access requests added to the queue in a time period.

17. The apparatus of claim 15, wherein the distributing includes assigning the first master server among the plurality of master servers to process fewer database access requests than any other master server among the plurality of master servers.

18. The apparatus of claim 15, wherein the distributing includes, for each database access request, determining which master server among the plurality of master servers to assign based on a load balancing scheme, and assigning the determined master server among the plurality of master servers to process the database access request.

19. The apparatus of claim 18, wherein the determining includes, for each database access request, determining which master server among the plurality of master servers is assigned fewest requests in the queue.

20. The apparatus of claim 15, wherein the assigning includes assigning the first master server among the plurality of master servers to process the database access requests in response to the database access requests in the queue falling below a second threshold while distributing assignments, and the second threshold is lower than the first threshold.

* * * * *